(12) United States Patent
Meisingset

(10) Patent No.: US 8,896,608 B2
(45) Date of Patent: Nov. 25, 2014

(54) METHOD FOR PROVIDING AN ANIMATION FROM A PRERECORDED SERIES OF STILL PICTURES

(75) Inventor: Arve Meisingset, Skjetten (NO)

(73) Assignee: Movinpics AS, Oslo (NO)

( * ) Notice: Subject to any disclaimer, the term of this patent is extended or adjusted under 35 U.S.C. 154(b) by 848 days.

(21) Appl. No.: 11/990,142

(22) PCT Filed: Aug. 7, 2006

(86) PCT No.: PCT/NO2006/000291
§ 371 (c)(1),
(2), (4) Date: Feb. 7, 2008

(87) PCT Pub. No.: WO2007/018435
PCT Pub. Date: Feb. 15, 2007

(65) Prior Publication Data
US 2009/0141031 A1    Jun. 4, 2009

(30) Foreign Application Priority Data
Aug. 10, 2005 (NO) .................................... 20053791

(51) Int. Cl.
*G06T 13/00* (2011.01)
*G06T 13/80* (2011.01)
(52) U.S. Cl.
CPC ..................................... *G06T 13/80* (2013.01)
USPC ........................................ 345/474; 345/473
(58) Field of Classification Search
USPC ......................................................... 345/473
See application file for complete search history.

(56) References Cited

U.S. PATENT DOCUMENTS 5,604,512 A    2/1997 Okamoto et al.
6,111,582 A *  8/2000 Jenkins .......................... 345/421
(Continued)

FOREIGN PATENT DOCUMENTS

EP    1-089-562 A1    4/2001
JP    63-143676 A     6/1988
(Continued)

OTHER PUBLICATIONS

Takuji Takahashi et al., "Arbitrary View Position and Direction Renderign for Large-Scale Scenes", IEEE Computer Society Conference on Computer Vision and Pattern Recognition vol. 2, 2000.*
(Continued)

*Primary Examiner* — James A Thompson
(74) *Attorney, Agent, or Firm* — Birch, Stewart, Kolasch & Birch, LLP

(57) ABSTRACT

The invention relates to a method for providing an animation from prerecorded still pictures where the relative positions of the pictures are known. The method is based on prerecorded still pictures and location data, associated with each still picture, that indicates the projection of the subsequent still picture into the current still picture. The method comprises the repeated steps of providing a current still picture, providing the location data associated with the still picture, generating an animation based on the current still picture and the location data, and presenting the animation on a display. The invention provides the experience of driving a virtual car through the photographed roads, either by an auto pilot or manually. The user may change speed, drive, pan, shift lane, turn in crossings or take u-turns anywhere. Also, the invention provides a means to experience real time, interactive video-like animation from widely separated still pictures, as an alternative to video-streaming over a communication line. This service is called Virtual Car Travels.

16 Claims, 9 Drawing Sheets

(56) References Cited

U.S. PATENT DOCUMENTS

| | | | |
|---|---|---|---|
| 6,199,014 B1* | 3/2001 | Walker et al. | 701/428 |
| 6,337,683 B1* | 1/2002 | Gilbert et al. | 345/418 |
| 6,798,407 B1* | 9/2004 | Benman | 345/419 |
| 6,980,690 B1* | 12/2005 | Taylor et al. | 382/154 |
| 7,477,987 B2* | 1/2009 | Walmsley et al. | 701/208 |
| 2003/0063133 A1* | 4/2003 | Foote et al. | 345/850 |
| 2006/0004512 A1* | 1/2006 | Herbst et al. | 701/208 |
| 2006/0132482 A1 | 6/2006 | Oh | |
| 2007/0055441 A1 | 3/2007 | Retterath et al. | |
| 2007/0110338 A1 | 5/2007 | Snavely et al. | |

FOREIGN PATENT DOCUMENTS

| | | |
|---|---|---|
| JP | 2004-325240 A | 11/2004 |
| WO | WO-97/42601 A1 | 11/1997 |

OTHER PUBLICATIONS

Takuji Takahashi et al., "Arbitrary View Position and Direction Renderign for Large-Scale Scenes", IEEE Computer Society Conference on Computer Vision and Pattern Recognition vol. 2, 2000.*

Andrew Lippman, "Movie Maps: An application of the Optical Videodisc to Computer Graphics", ACM SIGGRAPH Computer Graphics vol. 14 Issue 3, New York, NY Jul. 1980, pp. 32-42.*

Shenchang Eric Chen, "Quick Time VR- An Image-Based Approach to Virtual Environment Navigation", SIGGRAPH 95 Proceedings of the 22nd annual conference on Computer graphics and interactive techniques, New York, NY 1995, pp. 29-38.*

Shenchang Eric Chen and Lance Williams. 1993. View interpolation for image synthesis. In Proceedings of the 20th annual conference on Computer graphics and interactive techniques (SIGGRAPH '93). ACM, New York, NY, USA, 279-288.*

* cited by examiner

METHOD FOR PROVIDING AN ANIMATION FROM A PRERECORDED SERIES OF STILL PICTURES

TECHNICAL FIELD

The present invention relates to a method, a system, a client terminal and a computer program product for providing an animation from a prerecorded series of still pictures where the relative positions of the pictures are known.

BACKGROUND OF THE INVENTION

US-2003/0090487 relates to a system and a method for providing a virtual tour, based on an organised set of still pictures. The system aims at giving a viewer the illusion of moving forward into the space depicted in a still picture.

US-2001/0034661 describes methods and systems for presenting a virtual representation of a real city. A user at a www client is enabled to navigate among interactive e-commerce items such as store fronts in a virtual city. The publication mainly relates to e-commerce aspects, and it apparently does not disclose a solution for virtual, continuous travelling in a virtual space defined by still pictures.

SUMMARY OF THE INVENTION

An objective of the present invention is to provide a method, a system, a client terminal and a computer program product for providing an animation from a prerecorded series of still pictures where the relative positions of the pictures are known.

The objective and other advantages of the invention are achieved by a method, a system, a client terminal and a computer program product as set forth in the appended independent claims.

Further advantageous embodiments of the invention are set forth in the dependent claims.

Additional features and principles of the present invention will be recognized from the detailed description below.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate a preferred embodiment of the invention. In the drawings.

DETAILED DESCRIPTION OF THE INVENTION

Overall System Overview

Figure 1:
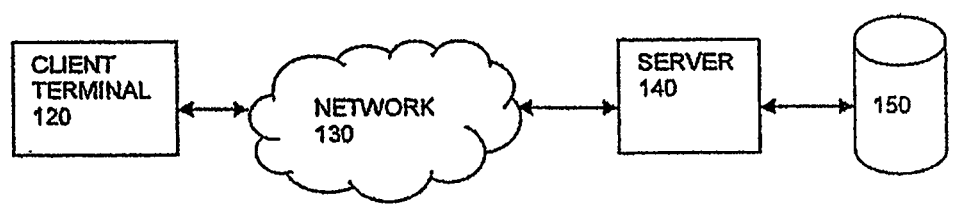
FIG. 1 is a schematic diagram illustrating the overall outline of a system according to the invention.

FIG. 1 is a schematic diagram illustrating the overall outline of a system according to the invention, A client terminal 120 is operatively connected to a server computer 140 through a communication network 130 such as the Internet. The server 140 comprises or is operatively connected to a data storage 150.

The structure as illustrated in FIG. 1 would also be applicable for regular video transmission according to prior art. In this case, video data would be stored in the data storage 150, the data is coded by means of a video coding process in the server 140, the coded data is transferred via the network 130, and the coded data is received and decoded in the client 120. The decoded data is then presented on a display in the client terminal 120.

According to the present invention, and as opposed to such a video coding/decoding approach, the data storage 150 contains data representing a series of still pictures and location data indicating the projection of a subsequent still picture into the current still picture. The still picture data and the location data are transferred to the client terminal 120 via the network 130. The client 120 is arranged for performing a method for providing an animation based on the current still picture and the location data, and for presenting the animation on a display.

Advantageously the still picture data held in the data storage 150 has been recorded in advance, e.g. by using a mobile recording arrangement such as the arrangement described with reference to FIG. 4 below. The invention is particularly appropriate for use with still pictures that are recorded from various locations along a physical road, in particular locations with a fixed distance between them. In this case, the resulting animation will result in the experience of a virtual travel along the physical road.

In practice, the still pictures may be relatively widely separated. Consequently, relatively small amounts of data need to be transferred from the server 140 to the client terminal 120 through the network 130. Thus a small network capacity is required. Local processing resources in the terminal are used in order to generate and present the animation.

Method for Providing an Animation from Prerecorded Still Pictures

Figure 2:
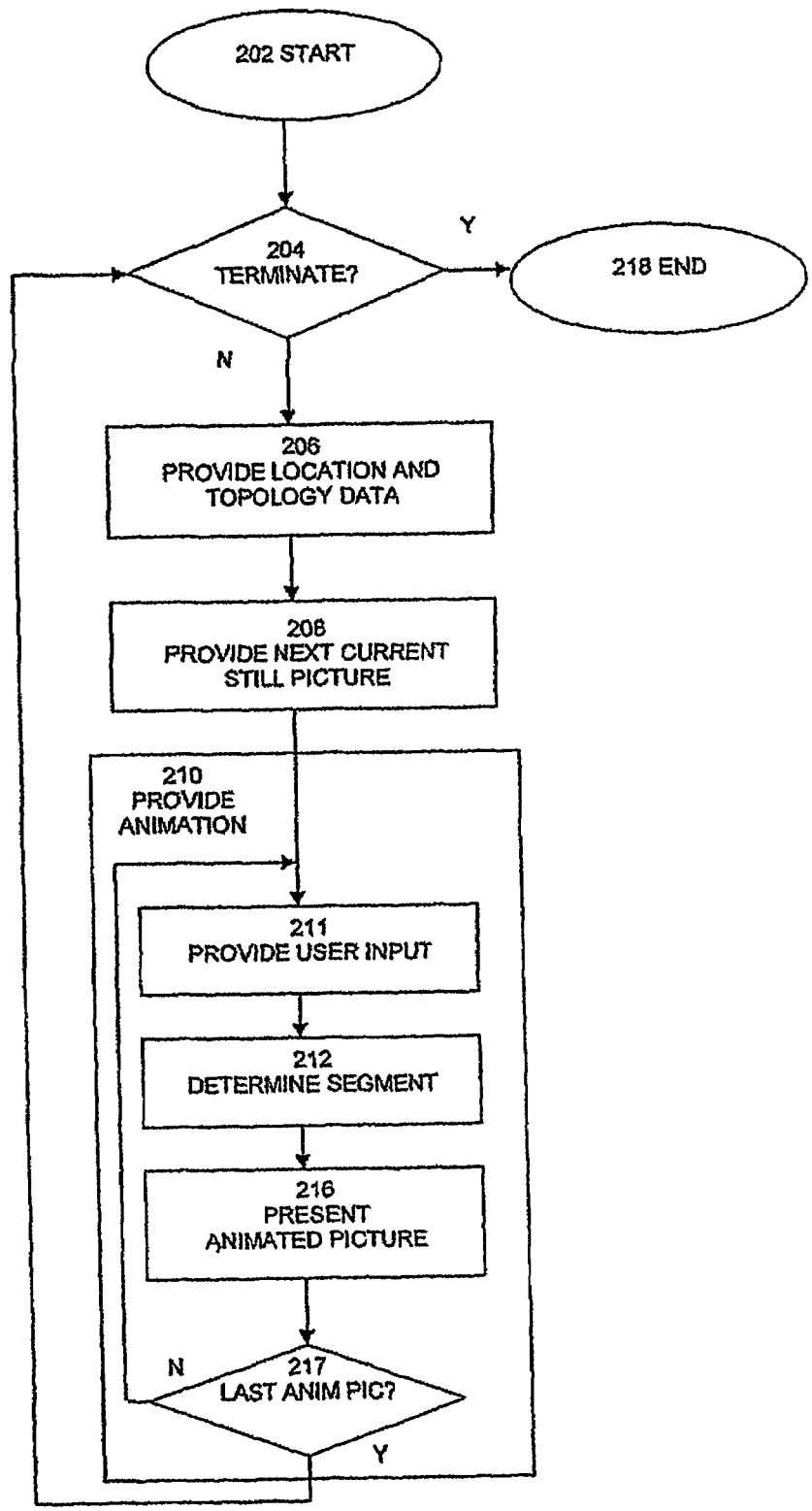
FIG. 2 is a schematic flow chart illustrating the principles of a method according to the invention.

FIG. 2 is a schematic flow chart illustrating the principles of a method according to the invention for providing an animation from prerecorded still pictures.

The method is explained also with reference to the system block diagram in FIG. 1. Thus, the method is advantageously performed by the client terminal 120 operatively connected to the computer network 130 such as the Internet.

The method starts at the initiating step 202.

First, in the decision step 204, a test is performed to determine if the overall process should be terminated, and if so, the process is terminated at the terminating step 218. This will be the case e.g. if no current still picture is available, or if a user input (or a terminating signal received from another process) indicates that the process should be terminated. The skilled person will realize that the decision step 204 has been presented for explanation purposes, in order to show that it should be possible to terminate the remaining, repeated process steps.

If the process is to be continued, step 206 is performed in order to provide location data indicating the location of a projection of a subsequent still picture into a current still picture (i.e., the current still picture that is provided in step 208 described below). The location data is received from the above mentioned data storage 150 by means of the server 140 or calculated based on such received data. Advantageously, the location data is derived from curve radius data associated with the current still picture and the distance between the current still picture and the subsequent still picture.

As described later in the description, the prerecorded still pictures may have been recorded by a camera with an associated camera angle, i.e. the angle between the camera axis and the horizontal plane. In this case, the location data may further be derived from the value of the camera angle.

The curve radius data may be provided by prerecorded measurements or by interpolation.

Figure 7:
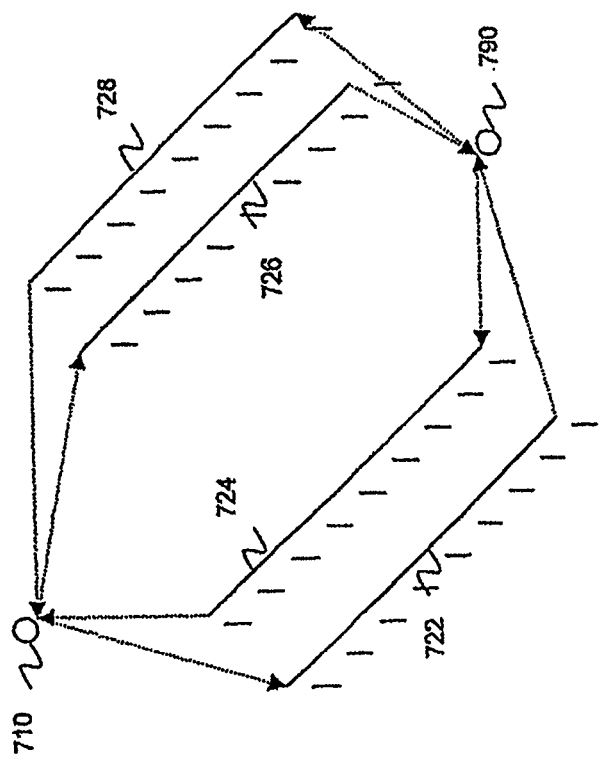
FIG. 7 is a schematic diagram illustrating a basic topology of paths of still pictures.

Advantageously, step 206 provides topology data. Topology data define the network structure of paths and nodes. The topology data are used to indicate permissible turning directions, lane shifts, U-turns etc. Cf. FIG. 7 and the corresponding detailed description.

Next, the step 208 is performed in order to provide the current still picture mentioned above in relation to step 206. The current still picture is advantageously received from the data storage 150 by means of the server 140 operatively connected to the computer network 130 such as the Internet.

The distance between the stored still pictures is advantageously predetermined and fixed, e.g. 20 meters.

The virtual picture screen associated with this subsequent still picture is advantageously located within a sector of the current still picture.

The location of the subsequent still picture in the current still picture is calculated by means of the location data. e.g., curve radius, and the predetermined distance between the current still picture and the subsequent still picture.

Next, in the animation providing step 210, an animation based on the current still picture and said location data is generated. The animation is thus generated as an extrapolation from the current still picture towards the calculated location of the subsequent still picture in the current still picture.

The animation providing step 210 comprises picture processing steps that result in a virtually continuous stream of events as experienced by a user. To this end, the animation providing step 210 comprises a first substep 211 of providing a user input 320. Relevant user inputs are described below with reference to FIG. 3 and the corresponding detailed description.

Further, the animation providing step comprises a second substep 212 of determining a segment of the current still picture corresponding to the projection of the subsequent still picture in to the current still picture, followed by a third substep 216 of presenting an animated picture derived from the current still picture. This third substep is basically performed by zooming towards the segment that is determined as corresponding to the position of the subsequent still picture. In addition, scrolling and panning towards the segment may advantageously be used.

Automatic scrolling is used to compensate for the camera axes possibly being tilted down towards the road, thus avoiding zooming down into the road surface.

Automatic panning is based on interpolation of the inverse of the curve radius, as the curve radius is a discontinuous function of the distance along the road. Panning is used for positioning through curves and in order to avoid zooming out of the road.

The third substep 216 may also comprise picture processing steps selected from the set comprising morphing, stitching, and dimming.

In the third substep 216, the animated picture is presented on a display, using regular animation presentation means.

Advantageously, the animation provides animated pictures at regular time intervals, typically 10 animated pictures per second, independent of the speed.

Advantageously, the third substep 216 comprises setting the speed of the animation according to a user speed input provided in step 211.

Advantageously, the third substep 216 comprises setting the panning of the animation according to a user panning input provided in step 211.

If the prerecorded still pictures are prerecorded by a camera with an associated camera angle, the panning may also be set according to the camera angle.

After the third substep 216, a decision step 217 is performed in order to determine if the last animated picture has been presented. If this is true, the process continues at the decision step 204, resulting in that the above steps 206, 208, and 210 are repeated, unless the process is to be terminated. If the last animated picture has not been presented, the process continues at the first substep 211.

This results in an inner loop of substeps 211, 212, 216 (included in step 210) that handles animated pictures one by one, and an outer loop of steps 206, 208 and 210 that handles current still pictures one by one.

When the process is repeated by the outer loop controlled by the decision step 204, the still picture that was used as the subsequent still picture in the recently elapsed process steps 206, 208, and 210 will be selected as the next current still picture in the repeated execution of the process steps 206, 208, and 210.

The skilled person will realize that the sequential approach of the flow chart in FIG. 2 has been chosen for simplicity of explanation, and that other ways of implementing the method, including parallel processing, are also possible.

Moreover, the skilled person will realize that the order of the various steps may be altered as long as the processing of one particular step is not affected by the output of an indicated previous step. For instance, the steps 206 and 208 may readily be performed in the opposite order or even concurrently.

The method illustrated in FIG. 2 is preferably performed by a client process, wherein the used still pictures correspond to a sequence of prerecorded still pictures provided by a server process, said current picture corresponding to a first picture in said sequence of prerecorded still pictures.

Advantageously, as illustrated in FIG. 1, the client process is performed by the client terminal 120, and the server process is performed by the server computer 140, the client terminal 120 and the server 140 being operatively interconnected by the communication network 130. However, the invention also comprises alternative embodiments wherein the client process and the server process are concurrently performed by one single computer.

Virtual Gearbox Functionality

A virtual gear box functionality is provided by selecting the use of every second, third or fourth still picture when generating the animation (corresponding to the virtual second, third and fourth gear, respectively), rather than every single picture (which corresponds to the virtual first gear). Higher virtual gears are of course also possible.

In the method described in FIG. 2, the second virtual gear is achieved by selecting the next picture in the sequence of prerecorded still pictures as the subsequent picture. Thus, every second prerecorded still picture will be ignored, i.e. not used.

The third virtual gear is achieved by selecting the third next picture in the sequence of prerecorded still pictures as the subsequent picture in the method. Thus, two out of three prerecorded still pictures will be ignored.

The fourth virtual gear is achieved by selecting the fourth next picture in the sequence of prerecorded still pictures as the subsequent picture in the method. Thus, three out of four prerecorded still pictures will be ignored.

The selection may be made in accordance with a gear selection parameter set by a user input. Alternatively, the selection may be done automatically, based on the speed given.

The gear box functionality provides longer scenes, reduced communication requirement, and higher "speed experience" of driving.

Client Terminal for Performing the Method

Figure 3:
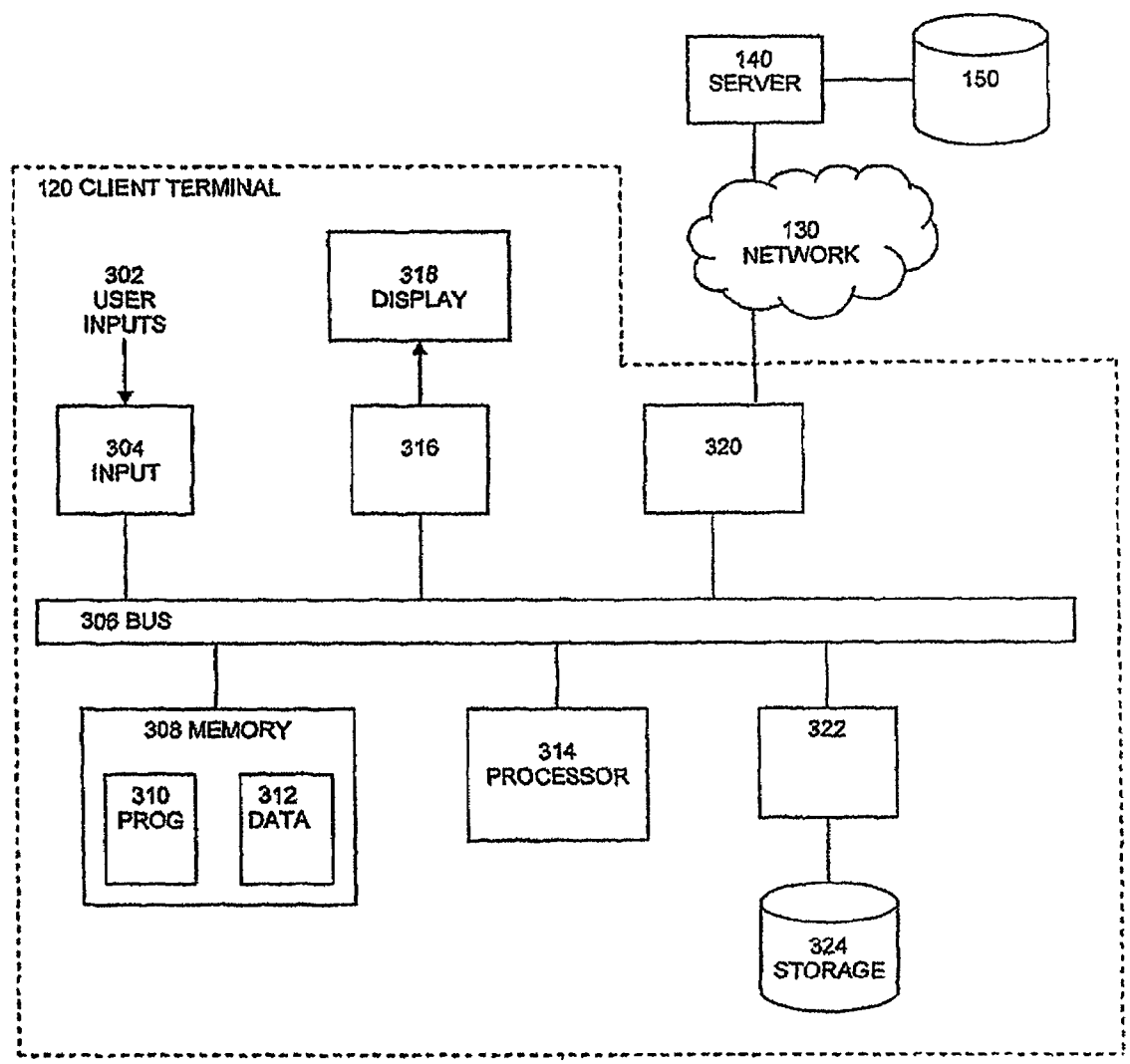
FIG. 3 is a schematic block diagram illustrating a client terminal arranged for operating in accordance with the invention.

FIG. 3 is a schematic block diagram illustrating a client terminal 120 operating in accordance with the invention.

The client terminal 120 comprises a bus 306, which is operatively connected to a processing device 314, such as a microprocessor. The bus 306 is further operatively connected to an input adapter 304, which is further operatively connected to user inputs 302. The user inputs may advantageously include:
- a speed input for setting the speed of the presentation of the animation,
- a gear parameter input for selecting "virtual gear", i.e. if the subsequent picture shall correspond to the next, the second next or the third next node in the network path.
- a turn parameter input for steering the animation through series of pictures in paths, legs and roads where permitted,
- a lane shift input for providing a virtual lane shift in the animation where permitted, and
- a U-turn user input for providing a virtual U-turn in the animation where permitted.

More specifically, the various input devices 302 include a keyboard and a pointing device such as a mouse or touchpad.

Turn, lane shift and u-turn may alternatively be accomplished as an effect of panning.

The bus 306 further comprises a display adapter 316 which is further connected to a display 318, such as a LCD or CRT display.

The bus 306 is further operatively connected to a network adapter 320, which is further connected to a computer network 130 such as the Internet. The client terminal is thus enabled to communicate with other computers which are operatively connected to the network 130.

The network 130 is operatively connected to a server 140, which comprises or is operatively connected to a data storage 150 arranged for storing still pictures data, as described previously with reference to FIG. 1.

The bus 306 is further connected to a data storage adapter 322, further connected to a local data storage 324, such as a hard disk drive.

The bus 306 is further operatively connected to a memory 308, which comprises a program memory 310 and a data memory 312.

As will be appreciated from the above description of the client terminal 120, the hardware of the client terminal 120 may be a regular computer such as a stationary or portable PC.

However, the terminal is particularly arranged for the technical purpose of performing a method in accordance with the present invention, for providing an animation from a prerecorded series of still pictures where the relative positions of the pictures are known. To this end, the program memory 310 comprises computer program instructions which are arranged to cause the client terminal 120 to perform a method in accordance with the present invention, in particular as described with reference to FIG. 2 above, when these instructions are executed by the processing device 314.

Recording Arrangement

Figure 4:
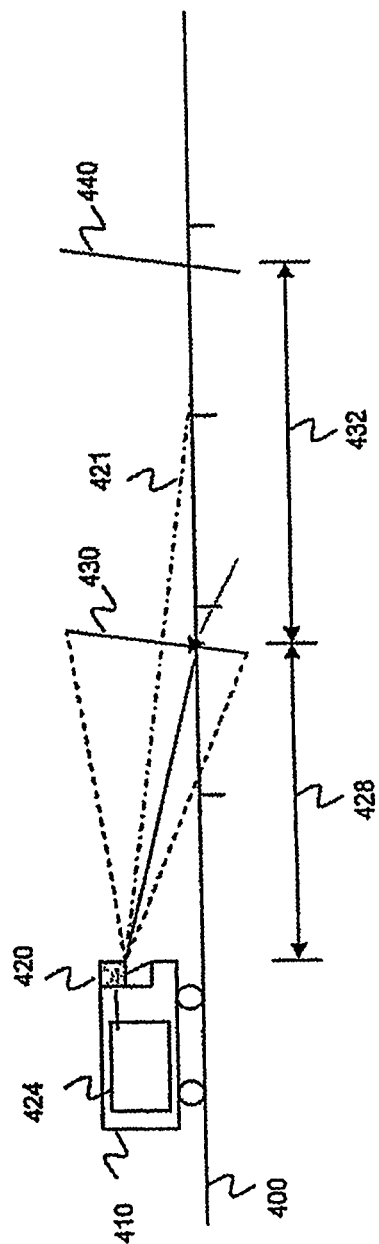
FIG. 4 is a schematic diagram illustrating a mobile recording arrangement.

FIG. 4 is a schematic diagram illustrating a mobile recording arrangement.

The present invention is based on a number of prerecorded still pictures where the relative positions of the pictures are known. The still pictures may have been created in various ways. Preferably, the still pictures are shot from paths in a real landscape, by the use of a mobile recording arrangement as illustrated in FIG. 4. Advantageously, the still pictures are shot at certain distances along a real road.

The recording is typically performed as illustrated in FIG. 4. A vehicle 410 is driving along the road 400. The vehicle 410 is carrying a camera 420, preferably a digital camera, which is mounted at the front of the vehicle and arranged to take still pictures of a portion of the road and its surroundings. A still picture depicting the virtual picture screen 430 is taken by the camera 420 when the vehicle is at a position at a distance 428 ahead of the virtual picture screen 430. The distance 428 is typically 10-20 meters. Correspondingly, another picture is taken by the camera 420 when the vehicle is at another position typically at a distance 10-20 meters ahead of the subsequent virtual picture screen 440. The distance 432 between subsequent virtual picture screens, such as the first 430 and the next 440 virtual picture screen, is typically 20 meters. In the illustration, the camera axis is slightly sloping down towards the plane of the road 400. The angle between the camera axis and the horizontal direction may be between 0 and 15 degrees, e.g. 10 degrees.

The camera 420 and the measurement equipment are controlled by a control unit 424 in the vehicle. The control unit 424 comprises measurement equipment which provides direction data associated with a picture shot, including measurement of the curve radius of the road 400 at the point where a particular picture is shot. To this end, the measurement equipment in the control unit 424 comprises e.g. a gyro.

The control unit 424 further comprises a data storage and is arranged to store the still pictures and the corresponding direction data in associated records in the data storage.

When the recordings of still pictures and associated direction data have been completed, the resulting data may be transferred from the data storage in the vehicle to a data storage 150 in a central database system, which is already described with reference to FIG. 1 and FIG. 3.

The mobile recording arrangement shown in FIG. 4 is previously known per se for other purposes.

Relation Between a Current Still Picture and a Subsequent Still Picture

Figure 5:
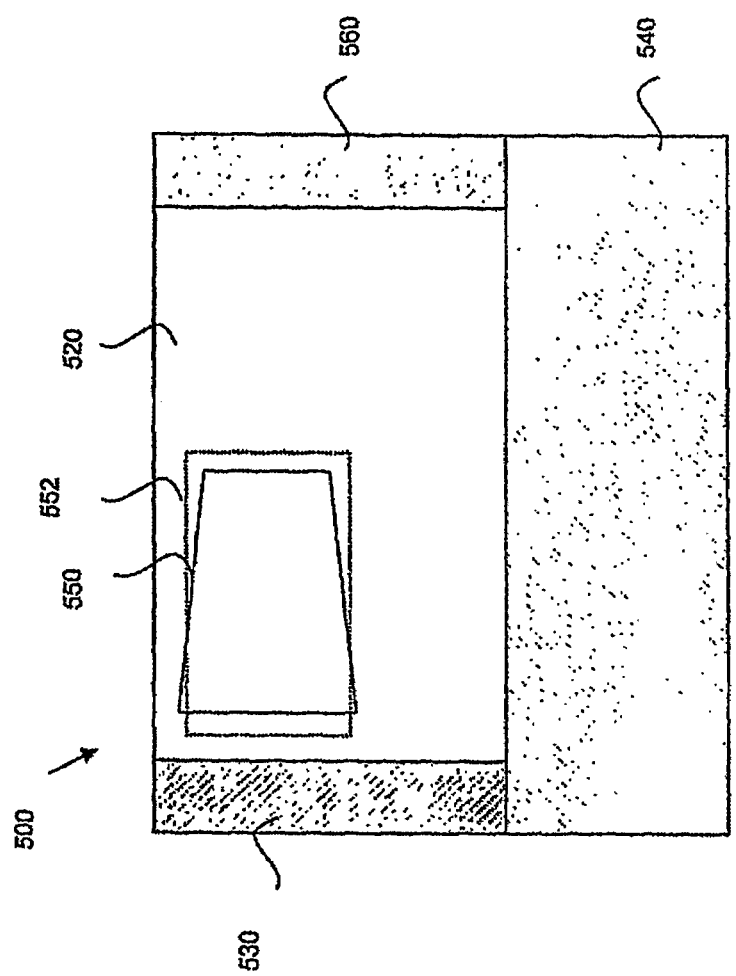
FIG. 5 is schematic diagram illustrating the relation between a current still picture and a subsequent still picture.

FIG. 5 is a schematic diagram illustrating the relation between a current still picture and a subsequent still picture.

From the picture screen 500, i.e. the current still picture that has been recorded by the camera 420, a lower portion 540 is advantageously cut off or ignored. Of the remaining upper portion, a central portion 520 is used, while a left-hand 530 and a right-hand 560 panning area are hidden from the regularly viewed portion. These hidden areas are however still available in the stored still picture data for panning purposes.

The location of the subsequent picture screen is included in the present picture screen and illustrated at 550. This location is calculated by means of the location data, including curve radius data, and the predetermined distance 432 between still pictures.

The rectangle 552 drawn with dotted line indicates the final picture in an animation generated based on the central portion 520 as the current still picture. As can be seen, the final picture 552 in the animation approximately coincides with the subsequent still picture 550, which will be used as the next current still picture in the resulting animation.

Figure 6:
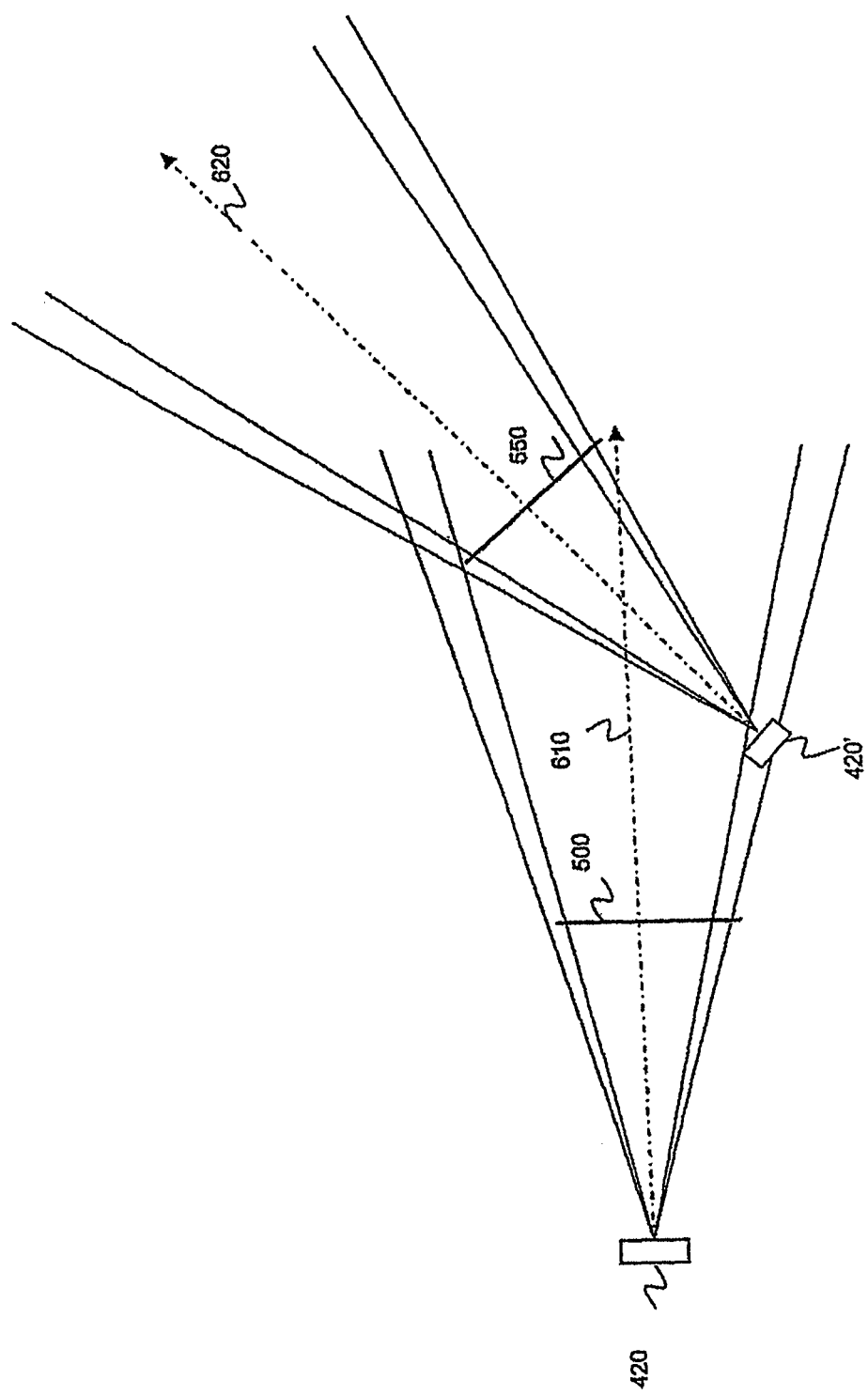
FIG. 6 is a diagram schematically illustrating views from two succeeding camera positions.

FIG. 6 is a schematic diagram illustrating views from two succeeding camera positions, corresponding to the diagram in FIG. 5.

In FIG. 6, the axis or zooming direction of the camera 420 in the first camera position is indicated at 610. In this position the virtual picture screen is schematically indicated by the line 500. The left-hand 530 and right-hand 560 panning areas not specifically indicated, but they are suggested at the end portions of the line 500.

The axis or zooming direction of the camera 420 when positioned in the subsequent camera position is indicated at 420'. In this second position, the virtual picture screen corresponds to the subsequent picture screen 550 illustrated in FIG. 5.

Topology of Paths. Turning, Lane Shifts and U-Turns.

FIG. 7 is a diagram schematically illustrating a basic exemplary topology of two nodes 710, 590 and four unidirectional paths 722, 724, 726, and 728. Each path includes nine still pictures, indicated as vertical, small bars along each path. The paths may represent tracks in driver lanes on legs of roads within a geographical area in a country or state.

Nodes 710, 790 represent virtual road crossings and define permissible turning directions.

As explained below, permissible turns, lane shifts and U-turns may be provided when performing a virtual travel through the topology of paths.

Nodes 710, 790 also provide access points to start the animation. As an additional feature, the nodes may be shown in a map on a display on the client terminal. Nodes may represent either real or virtual crossings, such as administrative borders, end of a blind road, suitable distance from another crossing, geographical layout of a road, detailed and superstructure of a roundabout.

Further advantageous features of the method according to the invention as described with reference to FIG. 2 will be described in the following with particular reference to FIG. 7.

In an embodiment of the method, the currently used still picture is the last still picture in a unidirectional path terminating at a node in a network of unidirectional paths between nodes. In this case, the subsequent used still picture may correspond to a still picture belonging to a path originating from this particular node. This enables a turn from one path to another.

In a particular embodiment, the path originating from the above particular node is selected in accordance with a turn parameter set by a user input or by default. This enables the user to make turns in the virtual travel at appropriate virtual crossings.

In another embodiment of the method, virtual lane shifts are enabled.

In this embodiment, the currently used still picture is an intermediate picture in a unidirectional path. Further, the subsequent used still picture is selected as corresponding to a still picture belonging to a parallel, identically directed path. Advantageously, this selection is provided by a lane shift user input.

In still another embodiment of the method, virtual U-turns are enabled.

In this embodiment, the currently used still picture is an intermediate picture in a unidirectional path. Further, the subsequent used still picture is selected as corresponding to a still picture belonging to a parallel, oppositely directed path. Advantageously, this selection is provided by a U-turn user input.

Sequences of still pictures are preferably organised within the paths. In FIG. 7, sequences of still pictures are indicated by short vertical lines along each path 722, 724, 726, 728. Different paths/tracks on the same driver lane may represent series of pictures shot at different events, being prepared differently or providing other information A path may contain zero, one, two, three or many more pictures; e.g. a path of zero pictures may be used to represent the structure of a roundabout. In FIG. 7, each path contains nine still pictures.

Scene Shift Effects

Figure 8A:
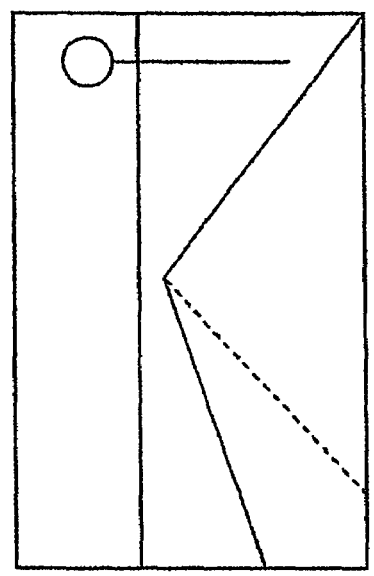
FIGS. 8a and 8b are schematic diagrams which depict two picture screens, illustrating a jumping effect of scene shifts after zooming.
Figure 8B:
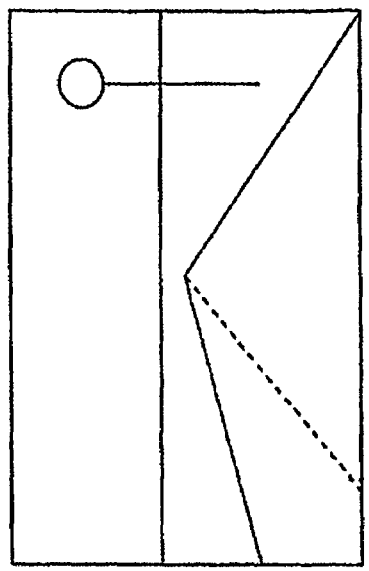

FIGS. 8*a* and 8*b* are schematic diagrams which depict two picture screens, illustrating a jumping effect of scene shifts after zooming.

FIG. 8*a* illustrates a picture screen zoomed in and adjusted for direction differences, i.e. the result of an extrapolation process of a current still picture. This adjustment is performed by scrolling and panning, based on the direction data, i.e. curve radius data, and the predetermined distance between succeeding still pictures.

FIG. 8*b* illustrates the next current picture screen after the shift from the zoomed-in and adjusted first picture screen shown in FIG. 8*a*.

As can be seen, the extrapolated (zoomed and adjusted) version of the first still picture, shown in FIG. 8*a*, is quite similar to the subsequent still picture in FIG. 8*b*. However, objects that are far away in both pictures, such as mountains in the horizon, may be distorted by the zooming process in the first picture. This may lead to blinking, jumping or wave experiences when shifting to the subsequent still picture. This distortion may be compensated for by techniques of morphing, stitching, dimming and/or other means of picture processing that can provide an experience of a nearly continuous stream of events.

Comparison Between Video Communication and the Invention

Figure 9:
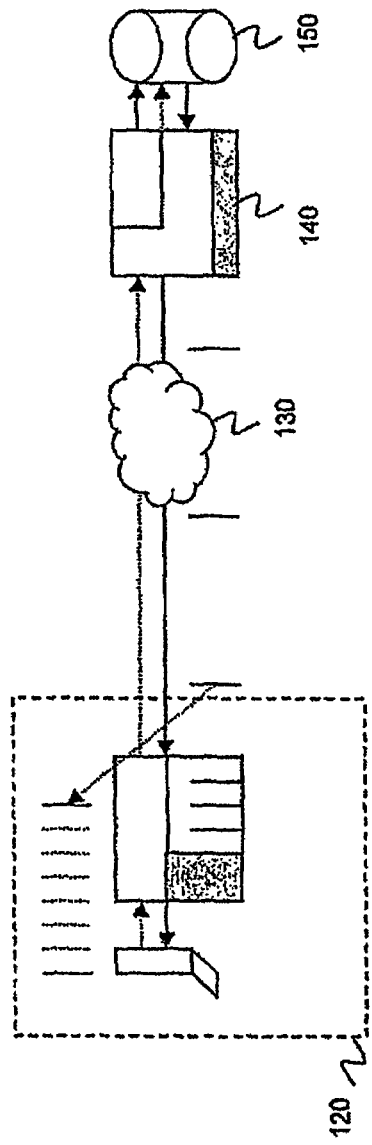
FIGS. 9a and 9b are schematic block diagrams illustrating two communication scenarios.
Figure 9:
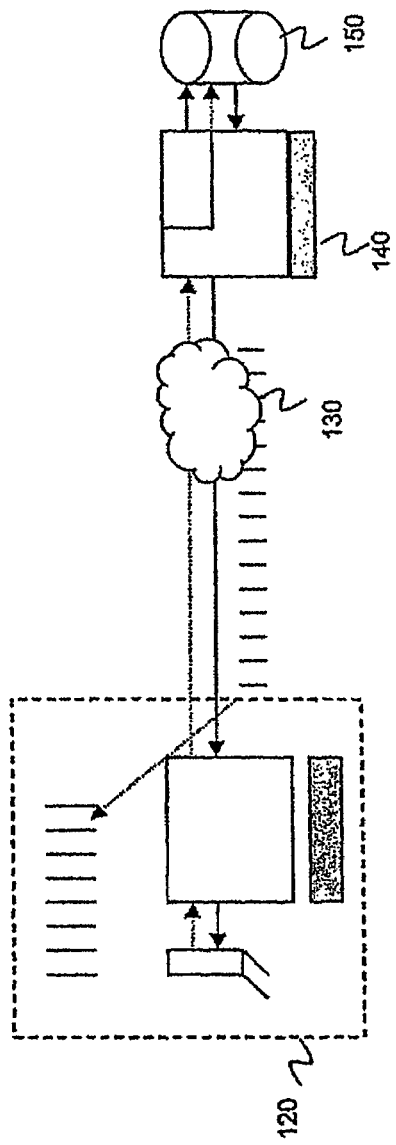

FIGS. 9*a* and 9*b* are schematic block diagrams similar to the schematic block diagram in FIG. 1, illustrating two communication scenarios.

In both FIGS. 9*a* and 9*b*, a client terminal 120 is operatively connected to a server computer 140 through a communication network 130 such as the Internet. The server 140 comprises or is operatively connected to a data storage 150. The vertical line segments schematically indicate amounts of transferred picture data through the network 130.

FIG. 9*a* illustrates a communication scenario in accordance with the present invention. In this case, the data storage 150 contains data representing still pictures and location data which represents the location of a projection of a subsequent still picture into a current still picture. As illustrated, due to the widely separated still pictures, only small amounts of data need to be transferred from the server 140 to the client terminal 120 through the network 130. Local processing resources in the terminal are used in order to generate and present the resulting animation.

FIG. 9*b* illustrates a communication scenario according to a regular video coding technology, wherein video coding/decoding is used in the server and the terminal, respectively. In this case, the data storage 150 contains video coded data.

ALTERNATIVES AND VARIATIONS

The above detailed description has explained the invention by way of example. A person skilled in the art will realize that numerous variations and alternatives to the detailed embodiment exist within the scope of the invention.

For instance, although the still pictures and the associated direction data have been indicated as advantageously being recorded data from the real-world, the skilled person will readily realize that the present invention will also be applicable with artificial or semi-artificial picture data and direction data.

Consequently, the scope of the invention is set forth by the appended claims.

The invention claimed is:

1. Method, by utilizing a client terminal and a server computer, for providing an animation from prerecorded still pictures provided by the server computer where the relative positions of the pictures are known, the method comprising the following steps:
   (a) providing a current still picture;
   (b) providing location data indicating the location of a projection of a subsequent still picture into the current still picture;
   (c) generating an animation based on the current still picture and said location data, and
   (d) presenting said animation on a display;
   wherein the location data indicating the projection of a subsequent still picture into the current still picture is retrieved from a data storage which also contains data representing the series of still pictures, and
   wherein said step (c) of generating an animation comprises picture processing steps that result in a virtually continuous stream of events as experienced by a user and
   wherein said client terminal and said server computer being operatively interconnected by a communication network.

2. Method according to claim 1, wherein said location data is derived from curve radius data associated with the current still picture, camera angle and the distance between the current still picture and the subsequent still picture.

3. Method according to one of the claims 1-2, wherein said subsequent still picture is located within a sector of the current still picture.

4. Method according to claim 1, wherein said step (c) of generating an animation comprises the steps of:
   (c1) determining a segment of the current still picture corresponding to the projection of the subsequent still picture into the current still picture, and
   (c2) generating a sequence of animated pictures derived from the current still picture by zooming, scrolling, and panning towards said segment.

5. Method according to claim 1, wherein said steps (a)-(d) are recursively repeated.

6. Method according to claim 5, wherein said step (d) of presenting the animation comprises setting the speed of the animation according to a user input.

7. Method according to claim 5, wherein said step (d) of presenting the animation comprises setting the panning of the animation according to a user input and camera angle.

8. Method according to claim 1, wherein said used still pictures correspond to a sequence of prerecorded still pictures provided by the server computer, said current picture corresponding to a first picture in said sequence of prerecorded still pictures.

9. Method according to claim 8, wherein said subsequent used still picture corresponds to the next picture in said sequence of prerecorded still pictures.

10. Method according to claim 9, wherein said subsequent used still picture corresponds to the second next, third next or fourth next picture in said sequence of prerecorded still pictures.

11. Method according to claim 8, wherein said subsequent used picture corresponds to the next, second next, third next or fourth next picture in said sequence, selected in accordance with a drive parameter set by a user input.

12. Method according to claim 8, wherein said current used still picture is the last still picture in a unidirectional path terminating at a node in a network of unidirectional paths between nodes, and
   wherein said subsequent used still picture corresponds to a still picture belonging to a path originating from said node.

13. Method according to claim 12, said path originating from said node being selected in accordance with a turn parameter set by a user input or by default.

14. Method according to claim 8, wherein said used still picture is an intermediate picture in a unidirectional path, and
   wherein said subsequent used still picture corresponds to a still picture belonging to a parallel, identically directed path upon selection by a user input.

15. Method according to claim 8, wherein said used still picture is an intermediate picture in a unidirectional path, and
   wherein said subsequent used still picture corresponds to a still picture belonging to a parallel, oppositely directed path upon selection by a user input.

16. A non-transitory computer readable storage medium having stored thereon computer executable program for providing an animation from prerecorded still pictures provided by a server computer to a client terminal where the relative positions of the pictures are known, the computer program when executed causes a computer system of said client terminal to execute the steps of:
   (a) providing a current still picture;
   (b) providing location data indicating the location of a projection of a subsequent still picture into the current still picture;
   (c) generating an animation based on the current still picture and said location data, and
   (d) presenting said animation on a display;
   wherein the location data indicating the projection of a subsequent still picture into the current still picture is retrieved from a data storage which also contains data representing the series of still pictures, and
   wherein said step (c) of generating an animation comprises picture processing steps that result in a virtually continuous stream of events as experienced by a user and
   wherein said client terminal and said server computer being operatively interconnected by a communication network.

* * * * *